(No Model.)

C. C. STALLMAN.
COMBINED ROTARY CALENDAR AND STAMP HOLDER.

No. 498,088. Patented May 23, 1893.

Witnesses,

Inventor,
Charles C. Stallman
By Dewey & Co.
Attys

UNITED STATES PATENT OFFICE.

CHARLES C. STALLMAN, OF SAN FRANCISCO, CALIFORNIA.

COMBINED ROTARY CALENDAR AND STAMP-HOLDER.

SPECIFICATION forming part of Letters Patent No. 498,088, dated May 23, 1893.

Application filed February 20, 1893. Serial No. 463,094. (No model.)

*To all whom it may concern:*

Be it known that I, CHARLES C. STALLMAN, a citizen of the United States, residing in the city and county of San Francisco, State of California, have invented an Improvement in a Combined Rotary Calendar and Stamp-Holder; and I hereby declare the following to be a full, clear, and exact description of the same.

My invention relates to a combined rotary calendar and stamp holder.

It consists in certain details of construction which will be more fully explained by reference to the accompanying drawings, in which—

Figure 1:
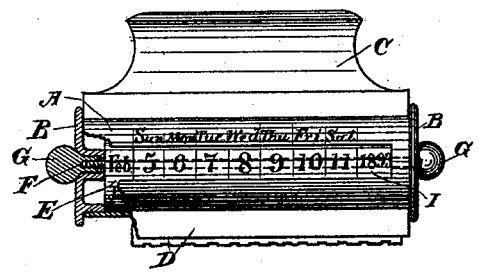
Figure 2:
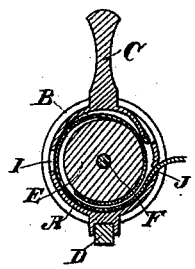

Figure 1 is a side elevation of my calendar. Fig. 2 is a vertical cross section of the same.

The object of my invention is to provide a convenient calendar, showing the days of the week, and in conjunction therewith a mechanism for displaying the successive weeks and months in the year, removing those which have already passed, and forming a stamp holder and handle upon the calendar, whereby the whole is arranged in a convenient, single article of desk furniture.

A is a hollow cylinder having the removable flanged head B, the flanges of which are of such diameter that they extend a short distance into each end of the cylinder. Upon one side of the cylinder is formed a handle C, and upon the opposite side is a projection or holder D adapted to receive and hold a rubber or other stamp of any suitable character. Within the cylinder is a drum E, having screw-threaded shaft F projecting from its ends and through holes made in the heads B, said holes having the outer ends countersunk of larger diameter than the shaft. Into these countersunk ends are fitted the nuts G having interior threads which fit upon the screw-threaded ends of the drum shaft, and the outer ends of the nuts are enlarged so as to form convenient handles by which they may be turned. By this construction the nuts serve to support the ends of the drum shaft, and when the latter has been turned to the proper point, the nuts are screwed down so as to hold it, or they may be screwed tight enough to allow it to revolve with a certain amount of friction sufficient to hold it steady. The nuts also serve to secure the heads in place while by removing them either or both heads may be removed so as to obtain access to the interior.

Around the drum shaft is coiled a flexible sheet having printed upon it in parallel lines, figures representing the month, days of the month and year, there being as many figures in each line as there are days in the week.

One side of the cylinder has an open slot made in it, as shown at I through which any one line of the figures showing months, days of the month, and year, may be inspected, and above this slot are imprinted in any suitable manner the names of the days of the week. It will be seen that by turning the drum and advancing the sheet, the days of the month for each succeeding week will be presented in front of the opening in the case. At one end of the sheet, in line with the rows of figures, will be marked the name of the month, and at the opposite end the year, so that the whole is readily seen at a glance. Upon the back or rear portion of the case is made a small slotted opening J of sufficient width to allow the free edge of the calendar sheet to pass out through it. One edge of this opening is made sharp, and the sheet is guided into the opening as it is gradually uncoiled from the drum, so that the portion of the sheet which has already been used will be projected through this opening, and it may then be cut off square by tearing it across the sharpened edge of the slot. A spring or springs formed by cutting and depressing a strip or strips in the cylinder, to press upon the flexible roll, serve to keep it tight and not allow it to unroll too rapidly. In this way I am enabled to dispose of the calendar sheet as fast as it has been used, and the inclosing case or drum may be made of such small diameter as to occupy but little space, and serve as a convenient desk ornament and utensil.

The flexible sheets may be renewed from year to year thereby admitting of the device being used indefinitely.

Having thus described my invention, what I claim as new, and desire to secure by Letters Patent, is—

1. As a new article of manufacture, a combined desk calendar and a stamp holder consisting of the cylindrical case having a handle projecting longitudinally upon one side and a stamp support upon the opposite side, a drum and shaft extending through the center of the case and having a calendar coiled thereon, and from which it may be unrolled, said case having an opening made in one side through which figures upon the calendar are presented, substantially as herein described.

2. A device consisting of a hollow cylinder having a handle upon one side and a projection upon the other for the attachment of a stamp, and having a slotted opening made longitudinally upon one side at a point intermediate between the handle and the stamp, a drum and shaft extending longitudinally through the center of the case, a calendar having the days of the month, the month and the year printed thereon in horizontal parallel lines, and adapted to be exposed successively through the opening in the case, the days of the week imprinted upon the case in a line parallel with the opening, a slot upon the opposite side of the case into which the free edge of the calendar sheet is guided through which the free edge of the calendar sheet passes and is removed, and means for rotating the shaft and advancing the calendar, substantially as herein described.

3. In a device consisting of a hollow cylindrical case having a handle and stamp carrier upon opposite sides, and having an open slot intermediate between the handle and carrier upon one side, a shaft extending longitudinally through the center of the case, a flexible sheet having imprinted upon it in parallel lines the month, days of the month and year, a means for indicating the corresponding days of the week imprinted upon the case parallel with the opening, flange heads fitting into the ends of the case having central openings through which the screw-threaded shaft of the calendar carrier projects and corresponding nuts adapted to receive the ends of the shafts, substantially as herein described.

4. A device consisting of a hollow cylindrical case with handle and stamp carrier projecting from opposite sides and a slotted opening upon one side of the case intermediate between the handle and stamp, and a discharge slot upon the opposite side with a cutter whereby the calendar may be removed in sections, a central shaft and drum around which a flexible calendar is coiled so as to be exposed in the opening upon one side and discharged through the slot upon the opposite side, flanged heads fitting the ends of the cylinder having central holes for the shaft of the calendar drum, screw-threaded shafts extending through the holes in the heads and nuts centrally threaded to receive and support the ends of the shafts, substantially as herein described.

5. In a combined calendar and stamp holder, a cylindrical shell, a longitudinal rotating drum journaled therein, a flexible calendar coiled thereon, said drum having openings through which the calendar is first exposed for inspection, and afterward passed out and removed after its dates have passed, and springs adapted to press upon the calendar coil to regulate its movement, substantially as herein described.

In witness whereof I have hereunto set my hand.

CHARLES C. STALLMAN.

Witnesses:
S. H. NOURSE,
J. A. BAYLESS.